US008378161B1

(12) United States Patent
Hemmings et al.

(10) Patent No.: US 8,378,161 B1
(45) Date of Patent: Feb. 19, 2013

(54) METHOD AND APPARATUS FOR MICROWAVE DEPOLYMERIZATION OF HYDROCARBON FEEDSTOCKS

(75) Inventors: John Hemmings, Katy, TX (US);
Thomas Pinto, Long Valley, NJ (US);
Viktor Sharivker, Ottawa (CA)

(73) Assignee: Climax Global Energy, Inc., Flanders, NJ (US)

( * ) Notice: Subject to any disclaimer, the term of this patent is extended or adjusted under 35 U.S.C. 154(b) by 0 days.

(21) Appl. No.: 13/471,619

(22) Filed: May 15, 2012

Related U.S. Application Data

(63) Continuation of application No. 13/333,097, filed on Dec. 21, 2011.

(51) Int. Cl.
*C07C 1/00* (2006.01)
(52) U.S. Cl. ............... 585/240; 201/19; 201/25; 201/30; 201/33; 202/100; 202/105; 202/265; 422/186; 219/700
(58) Field of Classification Search .................. 585/240, 585/241; 201/19, 25, 30, 33; 202/83, 100, 202/105, 265; 422/186; 219/700
See application file for complete search history.

(56) References Cited

U.S. PATENT DOCUMENTS

| 3,843,457 | A | * | 10/1974 | Grannen et al. ............... 201/2.5 |
|---|---|---|---|---|
| 5,330,623 | A | * | 7/1994 | Holland .......................... 201/19 |
| 5,366,595 | A | * | 11/1994 | Padgett et al. .................. 201/19 |
| 6,184,427 | B1 | * | 2/2001 | Klepfer et al. ................ 585/241 |
| 6,618,957 | B2 | * | 9/2003 | Novak et al. .................... 34/264 |
| 6,693,265 | B1 | * | 2/2004 | Bell et al. ....................... 219/686 |
| 6,797,126 | B2 | * | 9/2004 | Sharivker et al. ........ 204/157.15 |
| 7,101,464 | B1 | * | 9/2006 | Pringle .......................... 202/113 |
| 7,361,303 | B2 | * | 4/2008 | Kantor et al. ................... 422/22 |
| 2004/0031731 | A1 | * | 2/2004 | Honeycutt et al. ............ 208/402 |

* cited by examiner

*Primary Examiner* — Nina Bhat
(74) *Attorney, Agent, or Firm* — Mintz, Levin, Cohn, Ferris, Glovsky and Popeo, P.C.

(57) ABSTRACT

A method and apparatus is provided for the continuous microwave depolymerization of high molecular weight organic feedstock material, such as waste plastics and includes intermittent or continuous feeding of the processing material on the surface or into the bulk of the sensitized hot bed located under microwave irradiation. As a result of the interaction of electromagnetic field with processed materials, sensitizer is heated by microwave energy and feedstock material undergoes the depolymerization reactions. The reaction zone can be localized on the surface of the hot bed or distributed in the bulk of the reaction mass depending on the agitation conditions of the reaction mass, such as stirring, or other agitation means, for example by re-circulated gas. Products of the reactions are vaporized and transported to the collection system, which may include a combination of a scrubber, a condenser and a settler.

18 Claims, 8 Drawing Sheets

MICROWAVE DEPOLYMERIZATION PROCESS

100 MICROWAVE DEPOLYMERIZATION PROCESS

FIGURE 1: MICROWAVE DEPOLYMERIZATION PROCESS

EFFECT OF REACTION EXTENT ON PUMPABILITY OF BULK MATERIAL

MICROWAVE APPLICATOR

MICROWAVE APPLICATOR

JET SCRUBBER AND WAX SEPARATOR

JET SCRUBBER AND WAX SEPARATOR ARRANGEMENT

HYBRID THERMAL MICROWAVE REACTOR

Typical Hydroprocessing Arrangement

METHOD AND APPARATUS FOR MICROWAVE DEPOLYMERIZATION OF HYDROCARBON FEEDSTOCKS

RELATED APPLICATIONS

This application is a continuation of and claims the benefit of U.S. application Ser. No. 13/333,097, filed Dec. 21, 2011, which is incorporated by reference herein in its entirety.

BACKGROUND OF THE INVENTION

This application relates to a method and apparatus for the microwave depolymerization of hydrocarbon feedstocks, including plastic materials. An earlier effort is embodied in U.S. Pat. No. 6,184,427 entitled "Process and Reactor for Microwave Depolymerization of Plastic Materials", which is assigned to the assignee of the present invention. This patent discloses, among other things, using the interaction of microwave and sensitizers in order to provide heating and depolymerization of hydrocarbons. The present invention is an improvement upon such U.S. Patent.

SUMMARY OF THE INVENTION

In general, in one aspect, the invention provides a method and apparatus for the continuous processing of high molecular weight organic feedstock material (such as waste plastics, waste oils, petroleum residues, tires, oil sands, oil shale, cellulose and other bio material), which includes continuous feeding of the processing material on the surface or into the bulk of the sensitized hot bed (reacting mass pool) located under microwave irradiation. Processed material preferably may be used and may be fed as a powder, shredded solid, liquid or melted bulk items. Sensitized hot bed may preferably be melted or a powdered mixture, which consists from the initial and/or partially processed feedstock, microwave sensitizer material and catalyst. As result of the interaction of electromagnetic field with processed feedstock materials, the sensitizer is heated by microwave energy and the feedstock material undergoes reactions, such as de-polymerization, olefin oligomerization, dehydrogenation, isomerization, naphthene ring formation, aromaticization and chain branching The reaction zone can be localized on the surface of the hot bed or distributed in the bulk of the melt depending on the agitation conditions of the melt, such as stirring (or other agitation means, for example by re-circulated gas). The recycling off-gases (or other type of gases enriched with hydrogen) may be purged through the reaction zone allowing intensification of the exothermic reactions, such as olefin hydrogenation and oligomerization. Products of these reactions may be vaporized and transported to the collection system, which is preferably a combination of the scrubber, condenser and settler in one unit device. Process apparatus may include the integration of thermal and microwave depolymerization into the hybrid processing equipment. Process equipment can include a plurality or cascade of reactor chambers in order to separate depolymerization stages, as well as include post microwave treatment of products using distillation, hydroprocessing and isomerization.

In one aspect of the invention, a reaction vessel, enclosing a volume, receives the high molecular weight organic materials. A source of microwave energy is provided to impinge upon to heat the materials within the reaction vessel and cause microwave depolymerization of the materials. The depolymerized materials form liquids and vapors and the liquid migrates to the bottom of the reaction vessel. There is an opening in the reaction vessel to receive the high molecular weight organic materials. A collection apparatus removes one or more of the liquids and the vapors of the materials from the reaction vessel.

In another aspect of the invention, materials are introduced into a reaction vessel through an opening in the vessel. A microwave source is used to impinge microwave energy on the materials such that the microwave energy heats and depolymerizes the materials in the reaction vessel. The depolymerization step causes the formation of a vapor portion and a liquid portion from the materials. The liquid portion migrates to a lower portion of the reaction vessel. The liquid portion and the vapor portion are removed from the reaction vessel.

Variations may include one or more of the following features.

The apparatus may have an access opening in the top portion of the reaction vessel for at least one of continuous and intermittent feeding of the organic materials into the reaction vessel.

The source of microwave energy may introduce microwave energy through a waveguide into the reaction vessel from one or more entry ports located in the upper portion of the reaction vessel. The microwave energy may operate in the range from about 300 MHz to about 3 GHz. In one embodiment of the invention, the microwave energy operates at about 900 MHz.

The microwave energy may be of sufficient power and duration to cause microwave depolymerization of the high molecular weight materials. The impingement of microwave energy on the materials and the sensitizer may cause further sensitizer to be formed. Additionally, the sensitizer formed may be in the form of carbon particles. The sensitizer formed may also be in the form of carbon dendrites.

The collection apparatus may comprise at least two access ports into the reaction vessel, one of the at least two access ports being located in the liquid portion of the reaction vessel and another of the at least two access ports being located in the vapor portion of the reaction vessel. The at least two access ports remove the liquid and the vapor from the reaction vessel.

A scrubber may be operatively connected to one of the at least two access ports and condense the vapor removed from the reaction vessel.

The liquid portion or the vapor portion may be removed one of continuously and intermittently.

A separator device may be downstream of the scrubber. The separator device causes the separation of at least the vapor and the liquid of materials exiting form the scrubber.

The top portion of the apparatus may have a microwave cavity. The microwave cavity can be partitioned into at least two zones comprising an upper zone and a lower zone. The lower zone may be at a temperature higher than the temperature of the upper zone. In one embodiment of the invention, the temperature in the bottom portion of the reaction vessel may be in the range of about 250 degrees C. to about 425 degrees C. and the temperature in the top portion of the reaction vessel may be in the range of about 50 degrees C. to about 200 degrees C.

The mechanical mixer of the apparatus may be located in the bottom portion of the reaction vessel, the bottom portion of the vessel comprising a flat surface or an inverted truncated cone.

The apparatus may have a non-microwave source of heating at least partially contacting the bottom portion of the reaction vessel. The apparatus may have at least one source of heat to heat the top portion of the reaction vessel.

The collection apparatus may include a crude wax tank which receives the output from the reaction vessel access ports.

The apparatus may have one or more refining units downstream of the crude wax tank.

The refining units may be for short path distillation, hydroprocessing, isomerization and fractionation.

One or more refining units may receive the output from the crude wax holding tank.

The apparatus may have a barrier which is transparent to microwave energy located in the vicinity of the waveguide port to isolate the microwave energy source from the vapor and liquid in the reaction vessel. Additionally, the apparatus may have a port in the vicinity of the waveguide to introduce a gaseous material into the waveguide to isolate the microwave energy source from the vapor and liquid portions in the reaction vessel.

The apparatus may have at least one port in the reaction vessel to introduce high molecular weight materials in liquid form into the bottom portion of the reaction vessel.

The apparatus may have at least one port in the reaction vessel to remove high molecular weight materials in liquid form from the bottom portion of the reaction vessel.

The high molecular weight organic materials may be one or more of: waste plastics, waste oils, petroleum residues, tires, oil sands, oil shale and cellulose materials.

The pressure in the reaction vessel may be in the range of about minus 10 psig to about plus 15 psig.

The apparatus may have a sensitizer in the reaction vessel, the sensitizer being subjected to be impinged upon by the source of microwave energy.

The apparatus may have at least one port for the introduction of the gaseous material into the bottom portion of the reaction vessel for mixing the liquid portion of the materials in the bottom portion of the reaction vessel.

The apparatus may have at least one of a mechanical mixer and a gaseous material input positioned within the reaction vessel, the at least one of a mechanical mixer and a gaseous material input mixing the liquid portion of the materials.

A sensitizer may be introduced into the reaction vessel to assist in depolymerization the materials.

The removed vapor portion may be directed to a scrubber to condense the vapor portion.

The material from the scrubber may be directed to a separator device.

The reaction vessel may be a sealed vessel and the vessel pressure may be operated with an internal pressure in the range of about minus 10 psig to about plus 15 psig.

The temperature of the vessel may be maintained in the range of 250 degrees C. to about 425 degrees C.

The microwave depolymerization of the materials may produce additional sensitizer without the need for further introduction of further sensitizer into the vessel from outside the vessel.

The microwave source may be operated in the range of about 300 MHz to about 3 GHz. In one embodiment of the invention, the microwave source may be operated at about 900 MHz.

The temperature of the liquid portion may be in the range of about 350 degrees C. to about 425 degrees C.

A further source of heating may be provided to the reaction vessel to heat the materials in the vessel.

The liquid portion of the materials may utilize at least one of a mechanical stirrer and a gaseous fluid input for mixing.

One or more of the liquid portion and the vapor portion may be removed from the reaction vessel and collected in a crude wax holding tank.

The crude wax collected in the crude wax holding tank may be refined further.

Refining the molten heavy wax may include short path distillation, hydroprocessing, isomerization and fractionation.

These and other capabilities of the inventions, along with the invention itself will be more fully understood after a review of the following figures, detailed descriptions and appended claims.

DETAILED DESCRIPTION OF THE DRAWING FIGURES

DETAILED DESCRIPTION

Figure 1:
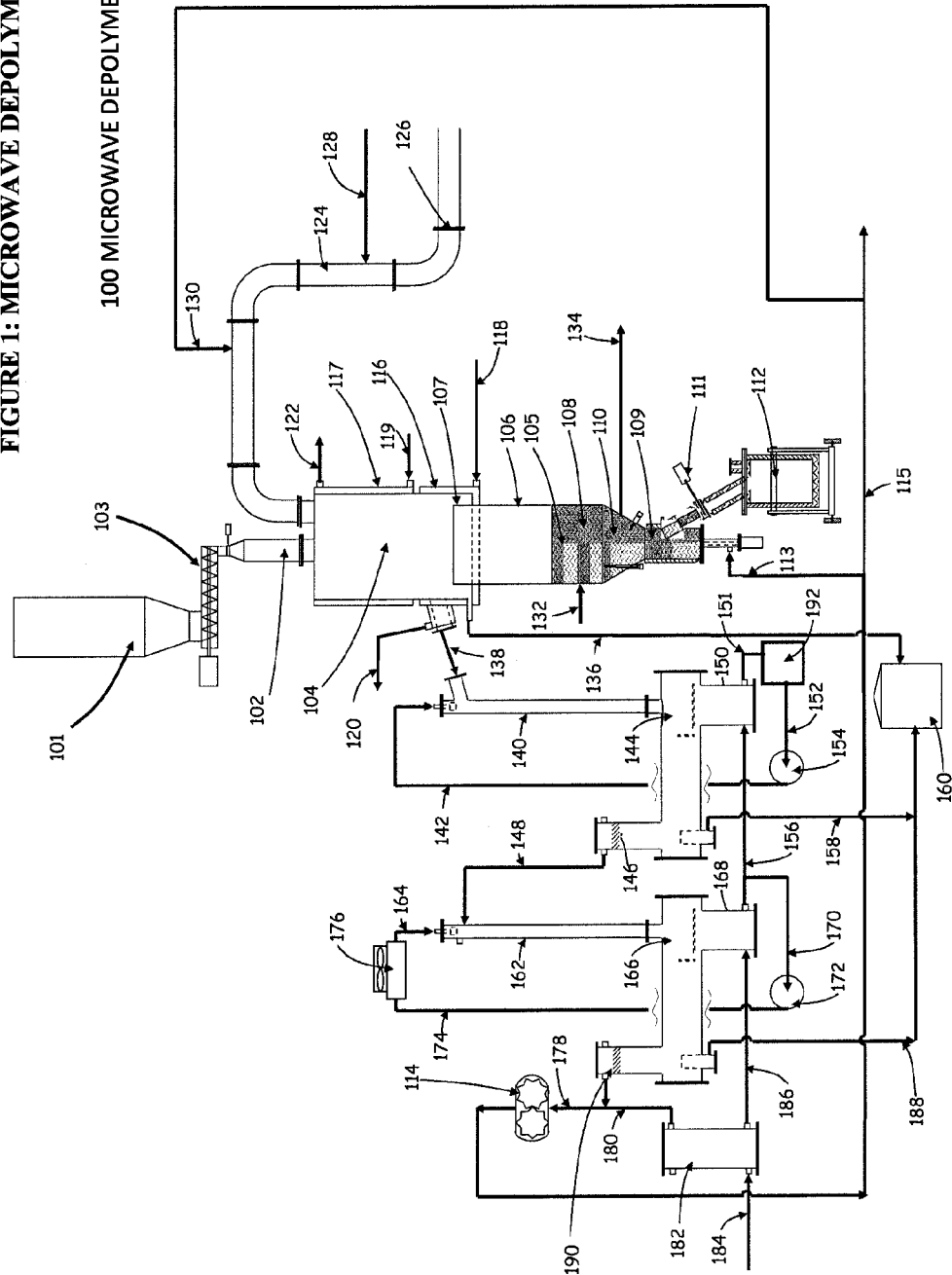
FIG. 1 is a schematic drawing illustrating in general the microwave depolymerization process of the present invention.

Description of Overall Microwave Depolymerization Process—Single Stage and Microwave FIG. 1 illustrates a schematic view of the overall microwave depolymerization apparatus of the present invention, designated as reference numeral 100. In FIG. 1, 101 denotes a vessel which is capable of being loaded with waste or low value hydrocarbon feedstocks in solid form, such as shredded waste plastics, or in liquid form such as waste oils. Other materials which may be used as hydrocarbon feedstocks include: high boiling point refining residue, waste coal, naturally occurring heavy hydrocarbons, such as uintahite and hydrocarbon by-products from manufacturing processes. The solid hydrocarbon feedstocks are transferred through flow line 102, using a suitable feeder device 103 which may be a screw type feeder but (depending on the flow properties of the material) could be another conventional feed system such as a pair of knife gate valves or a rotary feeder to feed the feedstock into the microwave cavity 104. Microwave cavity 104 is an electrically conductive enclosure (typically metal) which is large enough for microwaves (operating for example, at about 900 MHz) to propagate, preferably in several different modes.

It is understood that while a 900 MHz source is only one example of a particular frequency useful in the present invention, other frequencies may be useful, including the range of about 300 MHz to about 30 GHz. The basic principle underlying the application of microwave energy is the use of dielectric heating, that is, the conversion of electric energy to heat resulting from dielectric losses of an electric non-conducting material. Thus, the present invention may also employ sources in the dielectric heating frequencies which includes both radio frequency (RF) and microwaves.

Microwave cavity 104 contains gases, vapors and a descending stream of solid or liquid feedstock falling by gravity from flow line 102 into the lower part of the cavity where it accumulates in the form of reacting mass 105. In a preferred embodiment, reacting mass 105 is contained within a microwave cavity 106 which is smaller than and concentric to main cavity 104 and which has a dividing wall 107 which protrudes into the main cavity 104. The diameter of lower cavity 106 is selected relative to that of main cavity 104 such that 106 is at least large enough for microwaves to propagate freely. The gap between the dividing wall 107 and the inside wall of the main cavity 104 is large enough to ensure that there is no or at least minimal danger of arcing between the top of dividing wall 107 and the wall of cavity 104. Furthermore, the height of the dividing wall 107 may be chosen so that reflected waves from the coaxial part of the cavity effectively cancel out the incident waves. The reacting mass may be agitated by means of a mechanical agitator 108, which may include a Rushton-type turbine (flat blades) affixed to the end of a vertical shaft which may be rotated, for example by means of an electric motor and gears. Recycled gas, consisting predominantly of nitrogen, hydrogen and light hydrocarbons, for stripping depolymerized hydrocarbons from the molten reaction mass and to provide light olefins which may participate in oligomerization reactions, may be introduced below the agitator. In the preferred embodiment this is done by encasing the shaft in a pipe 109 and attaching a bubble cap 110 to the shaft below the turbine. The pipe 109 enters the lower cavity 106 from the bottom and has an internal diameter which may be significantly greater than the shaft of the agitator. Gas may be fed into the annulus between the pipe 109 and the shaft by means of flow line 113. The gas fills the annulus, and flows upwards into the agitated liquid at the rim of the bubble cap 110.

The circulating gases, the non-condensed gases that result from the depolymerization process and which exit from mist eliminator 190 consist mainly of uncondensed vapors and inert gases which originate from compressor 114. Gases from compressor 114 may also be used for waveguide inerting and excess gas can be used as fuel or simply flared. These surplus gases flow through flow line 115.

Microwave cavity 104 is enclosed in a jacket, which is split into a lower zone 116 and an upper zone 117. A cooling medium, typically a commercial heat transfer fluid, circulates independently through the lower and upper jacket zones by means of flow lines 118 and 120 for the lower zone, and 119 and 122 respectively for the upper zone. The inner wall of the cavity is maintained at a suitable temperature, typically in the range of about 50 to 120 deg C., by means of the coolant flow. The lower zone may be operated at a higher temperature to ensure that heavy wax is above its melting point and thus able to flow downwards. The specific temperatures are chosen having regard to the properties of hydrocarbons condensed from the gas stream.

Microwave energy may be fed into the cavity 104 by means of one or more waveguides 124 from one or more microwave generators. The waveguides may enter the cavity in one or in a number of paths. Three alternative ways are: either parallel to the axis of the cavity, orthogonal to the axis of the cavity, or as circularly polarized microwave energy parallel to the axis of the cavity. In one embodiment, at least one but preferably between 2 and 3 parallel circularly polarized waveguides parallel to the axis of the vessel are utilized. The waveguide may incorporate a vertical section running upwards. This is relevant in that the waveguide 124 should be filled with a clean gas with relatively high dielectric strength (such as nitrogen), whereas the main microwave cavity 104 is filled with hydrocarbon vapors and particulate carbon. It is generally desirable to prevent excessive ingress of hydrocarbon vapors from the cavity 104 into the waveguide 124. This is done by a combination of hydrostatic and hydrodynamic means. The waveguide may incorporate a window 126 made from a material transparent to microwaves. The waveguide section which runs vertically upwards, as shown in FIG. 1, downstream of the window 126 should ideally be filled with a gas which is denser than the hydrocarbon vapor present in the microwave cavity 104. The maintenance of sealing by a gas such as nitrogen is maintained by a small flow using flow line 128. A second flow line 130 is connected at the high point of the waveguide. A gas lighter than the hydrocarbon vapors will typically be added at this point (typically recycled light gases and nitrogen). This creates a situation where the waveguide from the window to the high point is filled with a gas heavier than the gas in the microwave cavity 104 while the section of waveguide from the microwave cavity to the highpoint is filled with gas lighter than that in the microwave cavity. It is preferable that the gas added to the top of the waveguide be less dense than that present in the cavity. A preferred gas to use for this purpose is recycled light gas from compressor 114. This gas mixture contains essentially the same chemical components as are present in the cavity, that is, a mixture of hydrocarbons, hydrogen and inert gases, however depleted in heavy hydrocarbons (relative to the gas in the cavity) and lower in temperature. It is also desirable, but not essential, that the gas from the compressor 114 be lighter than the gas added to the bottom of the waveguide. Thus the waveguide, 124, will be filled with a mixture of gases which are hydrostatically stable, and therefore gases containing particulates which are present in the cavity will not be able to contaminate the atmosphere in the waveguide. This is significant because the dirty gases from the cavity have a significantly lower breakdown voltage than the clean gases in the waveguide, which implies that should the dirty gases be allowed to accumulate in the waveguide (where the electric field strength is much higher than in the cavity), arcing and plasma generation are likely.

Returning now to a description of activity in microwave cavity 104, as mentioned above, solid feedstock enters the reacting mixture from flow line 102, and gases enter from the bottom through flow line 113. The reacting mixture is irradiated from above and is well mixed by virtue of mechanical stirring by agitator 108 and the action of the gases. Depolymerized hydrocarbons leave the reacting mixture in the gas phase through line 138. Condensed reflux also leaves the microwave cavity through flow line 136.

A small portion of the feedstock material has been observed to depolymerize to form carbon. In addition, there may be inorganic materials present in the feedstock as well as materials which produce significant amounts of carbon or other solids. The contents of the reactor can be removed periodically by means of a suitable valve 111 which leads to a vessel 112 which may be removably disposed. This arrangement provides a mechanism by which excessive solids accumulation can be handled.

Figure 2:
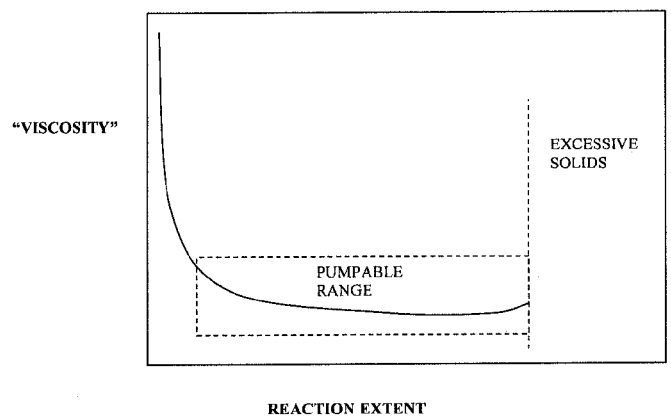
FIG. 2 is a graph which illustrates the effect of reaction extent on pumpability of bulk materials.

Optionally, liquid hydrocarbons can be introduced to the reacting mixture through flow line 132 and reacting mixture can be withdrawn through flow line 134. Line 134 may be utilized for feeding into a cascading reactor arrangement as discussed herein. It will be clear to those skilled in the art that the reacting mixture in vessel 106 may be considered to be essentially in a "continuous stirred tank reactor" ("CSTR"). It will consequently also be apparent that a plurality of such reactors can be connected in either a series or parallel arrangement in order to change the residence time distribution and thus overall throughput. It is not essential to add solid material to each stage when several reactors are joined together. For example, solid feedstock may be introduced to the first reactor only, with the other of the plural reactors performing the reaction process with the solid feedstock introduced into the first reactor. In further consideration of combinations of reactors, it may be useful to think in terms of a reaction parameter, which is defined to be zero for unprocessed feedstock and 100% when all feedstock which is able to react has reacted. It should be apparent that important physical properties, such as liquid viscosity, will be a strong function of the reaction parameter. For many of the feedstocks under consideration (such as, for example molten plastic and high boiling point refinery bottoms residues), the viscosity may start out at a very high value and drop when the material is partially depolymerized. Towards the end of the reaction, the effective viscosity becomes very high again due to the large amount of residual solid carbon present in the reacting mixture. Batch processing of mixed waste plastics has shown that the reacting material starts out as an extremely high viscosity melt. Then, as reaction starts to take place, the melt viscosity rapidly drops to a moderate value such that the material is relatively easy to mix and pump. The material remains easy to mix and pump until the reaction has proceeded to the point that formation of solid carbon is significant, and this is when it essentially becomes a solid mass. This general trend is shown graphically in FIG. 2. It should be noted that good mixing is essential to ensure that the microwave energy is effectively deployed.

It will be clear to those skilled in the art that a serial cascade of reactors may provide ideal reaction conditions for a material with physical properties (such as viscosity) as described. Each reactor in a cascade of CSTRs operates at a constant "reaction parameter," discussed above, and it is a relatively simple matter with a cascade of reactors to ensure that the "reaction parameter" remains in the range where good mixing is obtained for all reactors in that cascade, because the typical material viscosities allow for good pumping and good mixing, and thus good reaction conditions for microwave depolymerization as well as avoiding solids build-up. The same holds true for arrangements other than series. In particular, one arrangement that has been found to be useful with a solid feedstock such as mixed waste plastic is to feed solids in parallel into two or more reactors which are arranged in series with regard to the reacting mixture. This allows the reacting mixture in each reactor to be maintained at conditions close to optimal (in terms of reaction parameter). Additional reactors, after addition of all feedstock, in such a cascade can be designed to operate in the region where conditions are well mixed with the reactants from the final stage passing into a volume where the residue is allowed to continue to depolymerize until solid, with or without additional microwave energy.

As described above, the walls of the microwave cavity 104 are maintained at a lower temperature than the reacting mixture 105. There are likely to be very strong convection currents in the vapor space of a cavity, since the reacting mixture (at the bottom of the cavity) will be typically at about 350 to about 425 degrees C. while the cavity walls will be at 50 to 120 degrees C. The temperature differential creates a driving force for circulation as follows: hydrocarbons cool, condense and run down the walls of the cavity and are collected as a heavy wax product, leaving the cavity through flow line 136, and to crude wax tank 160. The uncondensed, cooled gases recirculate back from the walls to the center of the vessel and join the vapors leaving the reaction zone.

In addition to liquid wax, which may be withdrawn through flow line 136, materials are also withdrawn from the bulk gas through flow line 138, which keeps in balance non condensable fractions of the gases added to waveguide and to the reacting mass. The material passing through flow line 138 may include uncondensed gases with some of the entrained droplets and particles that did not condense into the heavy wax. In a simpler form of the apparatus of FIG. 1, there is no secondary reaction zone and flow line 138 is close coupled to a device, such as jet scrubber 140 to be described below, to condense the hydrocarbons. In principle, the hydrocarbons could be condensed in an exchanger or by direct contact, however due to the presence of hydrocarbon components which form solids, such as terephthalic acid, as well as solid carbon, it is convenient to use a jet scrubber with warm water as a condenser. Water is convenient as the circulating cooling medium because it makes it relatively simple to deal with hydrocarbons that form solid particles, such as wax. In principle, a light liquid hydrocarbon could be used, instead of water. In the preferred embodiment, scrubbing and cooling are carried out in two stages.

Reference numeral 140 in FIG. 1 denotes a jet scrubber, which consists of a section of pipe with a high velocity nozzle by means of which water is introduced axially flowing downwards by means of flow line 142. Gas from cavity 104 is introduced through flow line 138. Line 138 is preferably a short length of pipe and may be sloped towards the jet scrubber, as illustrated in FIG. 1, from the microwave cavity 104 so that liquids will nm into the scrubber.

The operating temperature of the scrubber preferably is maintained above the melting point of the wax so that the stream consists of a multi phase mixture of uncondensed gases, water droplets, hydrocarbon liquid droplets, sooty solids and possibly terephthalic acid, (in the case of plastics feedstock), and related materials (solid) which leave the jet scrubber and pass directly into a separator/settling vessel 144. The separator/settling vessel 144 includes a horizontal section (as illustrated) in which bulk separation of the phases occurs. The gas phase then passes up through a vertical section fitted with a mist eliminator 146 and leaves the top of the separator vessel through flow line 148. The aqueous liquid accumulates in a boot 150, which is sized to allow droplets of wax to disengage from the water. The water then passes by means of flow line 151 to a neutralization tank 192, which is designed and operates to allow the addition of neutralizing medium, such as limestone, and then flows through flow line 152 to pump 154 from which it is recirculated back to the scrubber by means of flow line 142.

Certain components of mixed waste plastics decompose to form acidic compounds. In particular PVC and CPVC decompose to form hydrochloric acid vapor. Limestone may also be added to the feed to provide the possibility of capturing the hydrochloric acid as calcium chloride, as a solid in the residue. This treatment removes a portion of the hydrogen chloride which forms but leaves some hydrogen chloride in the vapor phase.

In general, the hydrogen chloride is extremely soluble in water and therefore dissolves in the circulating water stream which is used to cool the vapors and condense the hydrocarbon liquid. The materials used for construction of this section of the apparatus are chosen so that dilute hydrochloric acid can be tolerated to a degree. In some cases, the water circulates through a packed bed of limestone chips in neutralization tank 192, upstream of the spray nozzle where the water and the vapors are brought into contact. In cases where there is carbon dioxide present in the vapors, which happens when carbon dioxide is used as the inerting gas and also when polyethylene terephthalate is present in the feedstock, the carbon dioxide dissolves to a degree in the circulating water stream and in turn the dissolved carbon dioxide enables the limestone chips to gradually dissolve since calcium bicarbonate is fairly soluble in water. So in cases where carbon dioxide is present, the circulating water is buffered by calcium bicarbonate, and carbon dioxide is liberated as hydrogen chloride is taken into solution. When there is no carbon dioxide present, the circulating water has a significantly lower pH, since calcium carbonate (limestone) is significantly less soluble than calcium bicarbonate. However, since the water is predominantly a circulating stream with a small makeup and blowdown, much of the hydrogen chloride is neutralized as the circulating water (in that case dilute hydrochloric acid) passes through the limestone bed.

The waste water from the process in general is therefore a mixture of calcium bicarbonate and calcium chloride solutions, with some free hydrochloric acid. The concentration depends on how much PVC is present in the feed, and the makeup and blowdown ratios. Since calcium chloride is extremely soluble, it is possible to operate the process allowing the calcium chloride content of the waste water to buildup. The waste water can then be further treated to recover calcium chloride as a byproduct.

The water temperature of the water in the scrubber is determined by the high temperature of gas and vapors from the microwave zone and the cooling effect is due to evaporation of circulating water. The temperature is preferably set above the wax melting point. Water flows from a subsequent scrubbing stage by means of flow line 156 which acts as a balance line and compensates automatically for evaporative losses. The wax overflows a weir and leaves by means of flow line 158 which leads to crude wax tank 160.

Vapors exiting mist eliminator 146 travel in flow line 148 and then pass to a second stage scrubber 162 in which they are contacted with cool water from flow line 164. The uncondensed gases as well as condensed water and hydrocarbons together with circulating water pass into a second separator/settling vessel 166 which may be similar in construction and operation to the first stage separator/settling vessel 144. Water from the boot 168 of the second separator/settling vessel 166 passes by means of flow line 170 to a pump 172 with a side stream passing back to the first settling vessel boot 150 by means of balance line 156. Water from pump 172 passes through flow line 174 through cooler 176 and thence back to scrubber 162 by means of flow line 164. Scrubbed vapors flow through mist eliminator 190 and leave the settling vessel by means of flow line 178 which passes to the compressor 114 described above. Wax flows through flow line 188 to crude wax tank 160.

Water vapor is still present in the gases leaving the second stage scrubber so that overall there is need for a make-up stream of water. This is accomplished by means of flow line 184 into balance tank 182. The vapor space of the balance tank 182 is linked to flow line 178 by means of balance line 180. The bottom of the balance tank 182 is linked to the boot 168 of the second stage separator/settling vessel 166 by means of balance line 186. The balance tank 182 and the two separator/settling vessels, 144 and 166, are arranged so that gravity suffices to ensure that water flows between the vessels as needed to maintain the desired levels. Consequently, overall, there is evaporation of water in the first stage scrubber and condensation of water in the second stage scrubber with flow by gravity from second to first stage separator/settling vessel to compensate for mass loss. The second stage scrubber 162 will typically condense slightly less water than the amount evaporated in the first stage, consequently there is a need for a constant make-up stream. This is handled by means of the balance line 186 from balance tank 182 with level maintained in balance tank by adding water through flow line 184.

Sooty solids will typically be entrained in the wax stream and will therefore flow to the crude wax tank 160.

Solids heavier than water, such as terephthalic acid, 4 formyl benzoic acid and similar breakdown products from polyethylene terephthalate depolymerization will accumulate in the boots (150,168) of the separator/settling vessels 144, 166 and will need to be disposed of periodically.

In summary then, the process takes waste plastic or other hydrocarbon feedstock solids, recirculated light gases, optionally liquid waste hydrocarbons (including material from a previous, similar stage of depolymerization) and produces a stream of heavy wax, a stream of lighter wax or liquid hydrocarbons, a stream of surplus gas, intermittently removed heavy solids and a stream of residue material which may be sent to a subsequent similar stage of depolymerization or to disposal.

Details of the Microwave Applicator

Figure 3A:
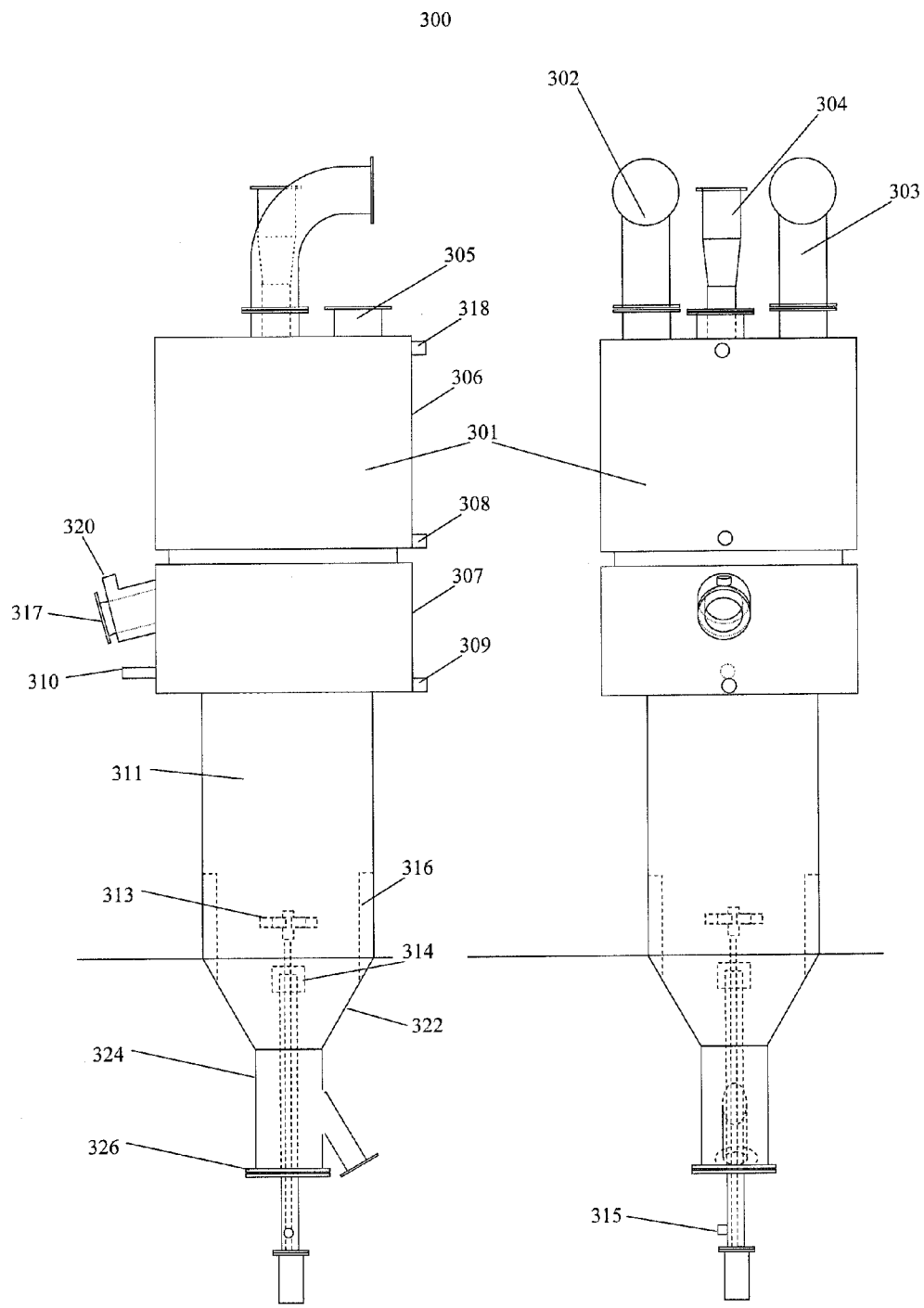
FIG. 3A is a schematic view of one embodiment of a microwave applicator having an inclined bottom section.
Figure 3B:
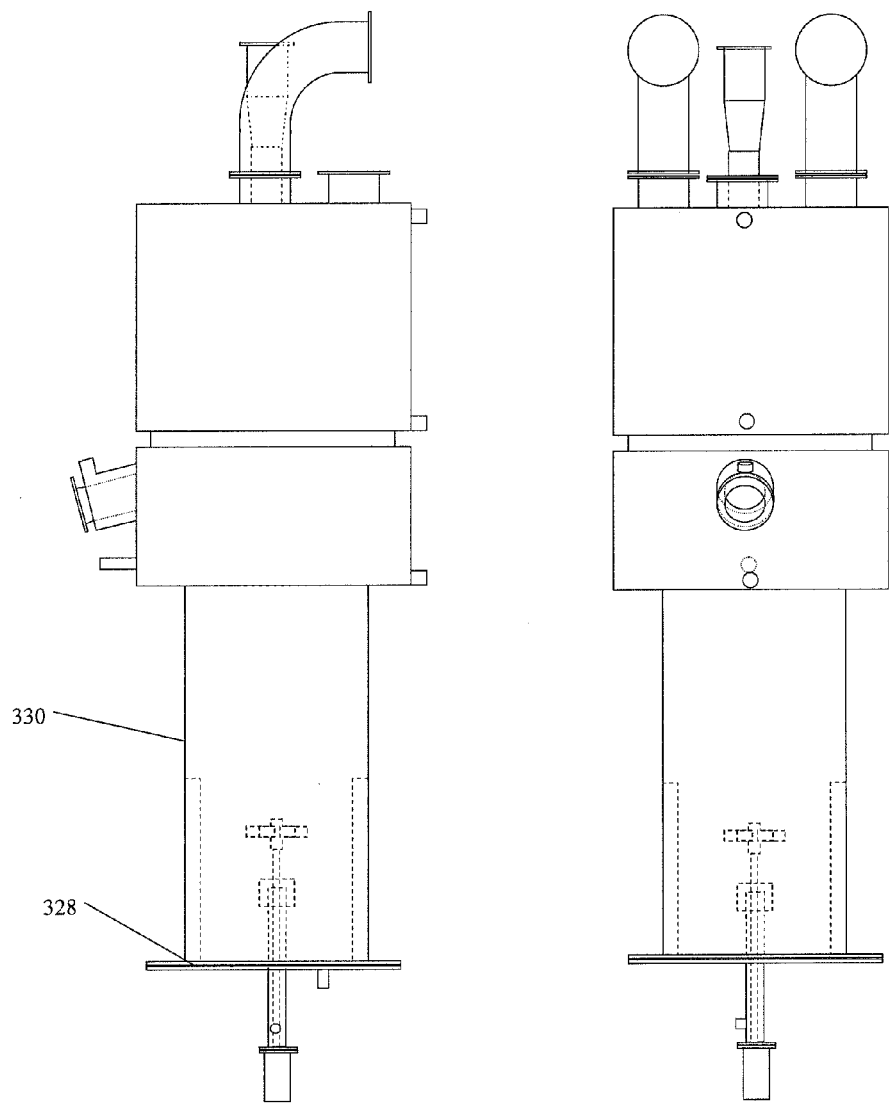
FIG. 3B is a schematic view of a second embodiment of a microwave applicator having a flat bottom.

Two embodiments of a microwave applicator are illustrated in FIGS. 3A and 3B, in which reference numeral 300 indicates the microwave applicator. The microwave applicator of FIG. 3A consists of a primary cavity 301 which is of sufficient diameter for microwaves to propagate freely and sufficient length for effective separation between the entry point of the microwave energy and the reacting mixture. In the embodiment shown in FIG. 3A, the microwave applicator includes a pair of circular waveguide ports 302 and 303.

While two waveguide ports 302 and 303 are shown, it is to be understood that any number of waveguide ports may be accommodated, depending on the specific microwave generator(s) used and the physical dimensions of the reactor vessel.

Alternatively, a pair of rectangular waveguides entering from the top could be employed. The applicator, as shown in FIG. 3A, is fed with energy from two microwave generators, (not shown) simultaneously so it is desirable to ensure that interference is minimized Each waveguide may be fitted with a polarizer to induce one handedness of circular polarization. The same polarizer will also prevent energy of the opposite handed polarity from propagating back up the waveguide.

Commercially available microwave generators are limited in size, with a typical maximum being approximately 125 kW, but with 75 kW being more typical. The ability of a well constructed cavity to handle microwave energy may exceed this amount by a significant margin, and consequently it may be desirable to feed energy from more than one waveguide at a time. The number of waveguides that can be accommodated at one time is a matter of the practicality of accommodating the necessary ports and waveguide. Beyond a certain point, the economics may favor simply adding additional applicators rather than additional generators feeding a single applicator.

Returning now to FIG. 3A, feedstock enters the cavity from the top through a nozzle 304, which is sized to allow free flow of solids but to prevent microwave energy from leaving the cavity, i.e. dimensions suitable to "choke" the microwaves, as is known to those of skill in the art. In general, the nozzle may be between 4" and 6" in diameter to fulfill these requirements.

An adequately sized nozzle, 305, is provided to act as an emergency vent in case of over pressurization. Such typically may be fitted with a bursting disc or similar device and vapors will be led away to be flared off or safely vented. The size of nozzle 305 is determined by systems engineering considerations and preferably the nozzle and associated flow line will be small enough that microwave energy will not propagate along the line. If it is deemed necessary to use a larger flow line, a suitable microwave choke may be incorporated into the nozzle.

The main cavity 301 is surrounded by a jacket for a heat transfer fluid, and is subdivided into two zones, 306 and 307. The heat transfer fluid circulates in by means of nozzles 308 and 309 and out through nozzles 318 and 320. This makes it possible to maintain the upper cavity walls with desired temperature ranges, which typically may be in the range of about 50 to about 120 deg C. The design goal is to maintain the cavity wall at a temperature such that desirable hydrocarbon components are able to condense on the wall and run out of the cavity. Furthermore, in the event that there is a significant amount of PVC present, the walls need to be maintained at a temperature above the acid dew point. Hydrocarbons which run down the walls flow out of the zone 307 through a wax outlet 310.

In operation, feedstock free falls through cavity 301 into lower cavity 311, which is smaller in diameter than cavity 301 and attached coaxially to the bottom of cavity 301. The diameter of lower cavity 311 is such that microwave energy can freely propagate into the lower cavity. The diameters of the two cavities are such that arcing does not occur between the top of the inner cavity and the wall of the outer cavity. The height of protrusion of the inner cavity into the upper cavity is such that heavy wax does not reflux into the lower cavity, but rather exits zone 307 through outlet 310 and, ideally, is such that microwave energy in the annular space between the walls of the two cavities is minimized.

A pool of reacting mixture is allowed to build up in the lower cavity 311, but typically does not fill the lower cavity. The reacting mixture pool is generally in a liquid state and consists of partially depolymerized feedstock as well as newly-fed unconverted plastic material and suspended solids. The pool may be agitated by means of a stirring device 313 or by means of gas added through bubble cap 314 or similar sparger device, having been introduced through nozzle 315 or both methods in combination. Typically, the stirring device will be a flat bladed turbine and accordingly vertical baffles 316 on the inner wall of cavity 311 may be used to promote good mixing. The agitation serves to help ensure that the mixture is well mixed. The reacting mixture may contain sensitizer and may contain catalysts depending on the desired slate of products. The earlier patent, that is, U.S. Pat. No. 6,184,427, discloses using the interaction of sensitizer and microwaves in order to provide heating and depolymerization of hydrocarbons. The disclosure of U.S. Pat. No. 6,184,427 is herein incorporated by reference in its entirety into this specification.

However, it has been discovered that the process of microwave depolymerization itself produces a type of carbon which is a good absorber of microwave energy. Consequently, it is only necessary, in the process of the present invention, to start out using a "seed" sensitizer, which is typically activated carbon and then allowing the system to build the sensitizer up naturally as the process proceeds and additional carbon is generated. The microwave energy is understood to be absorbed in the top layer of liquid, at a rate which depends on the concentration of sensitizer, which in general decays from the surface approximately exponentially so that it is reasonable to think in terms of a "half depth" or a depth at which microwave energy has decayed in intensity to 50% of the incident amount. It is desirable that the half depth be in the order of about 10 to about 100 mm so that the energy is absorbed reasonably uniformly throughout the reacting mixture. Bulk temperature is maintained reasonably uniform by the stirring action.

As illustrated in FIG. 3A, the bottom section 322 of lower cavity 311 in the vicinity of the bubbler 314 is in a shape of an inverted cone. This shaped vessel has been found to be beneficial to facilitate solid settling from the reaction mixture. Turning now to FIG. 3B, this figure shows the applicator of FIG. 3A in which all of the corresponding features are the same as in FIG. 3A, except for the region in the lower cavity bottom. In FIG. 3A, as described above, the bottom section 322 is first conically shaped before a cylindrical portion 324, followed by flat bottom wall 326, whereas in FIG. 3B, the bottom wall of cavity 328 is flat below cylindrical section 330. It has been found that utilizing a flat surface rather than a conical surface has the benefit of facilitating solids removal from the lower reactor cavity.

While the mechanism is not fully understood, it has been found that the microwave depolymerization of plastics produces a higher molecular weight product distribution than appears to be the case with conventional thermal depolymerization processes with similar process conditions. As is well understood to those skilled in the art, conventional heating is slow, relying on convection currents and thermal conductivity; whereas microwave energy transfer is rapid and occurs on a molecular level, and can be explained in terms of instantaneous localized high intensity energy transfer to the reaction mixture. The result is that microwave promoted chemical reaction times are much shorter than those based on conventional heating and occur at significantly lower bulk temperatures. It may be surmised that this may be due to a microwave effect or may be a consequence of the rapid heating and quenching which occurs in the microwave reactor vessel of the present invention. It is already well understood that microwave energy couples well to particulate sensitizer. It has also been observed that a highly effective sensitizer is the carbon which forms from the microwave depolymerization of hydrocarbon. The carbon is distributed as fine particles in the bulk liquid. Carbon dendrites can also be formed in the reactor from carbon particles due to "step-by-step" joining/combining of these small particles in the gas space on the solid surface substrate. Very small domains exist within the reaction mixture where the local temperatures can be 50 to several hundred degrees Centigrade above the bulk temperature of the mixture. Microwave depolymerization is understood to be a free radical reaction which typically requires a temperature significantly higher than the observed bulk temperature. It is therefore further surmised that free radical depolymerization occurs in spatially limited domains and is followed by immediate quenching in the surrounding bulk mixture. This appears to limit the amount of secondary depolymerization which occurs and consequently leads to a product which has a higher molecular weight distribution than that made under typical prior art thermal depolymerization mixtures with similar process conditions.

Utilizing the preferred embodiment of the invention to process a feedstock of mixed plastics recovered for municipal solid waste typically produces a wax with a melting point of 60 degrees to 70 degrees C. Those skilled in the art will recognize this melting point as being at least 20 degrees C. in excess of the melting point of the hydrocarbon mixture typically produced by conventional thermal depolymerization of the same feedstock.

The reacting mixture includes a variety of random length hydrocarbons, derived by degradation of polymers, and including light hydrocarbons, from about C4 to about C100,000, with typically 75% in the range C40 to C100. Lighter products, in the range of about C4 to about C60 with typically 75% between C18 and C40, are removed as a consequence of the flow of gases through the reacting mixture and pass into the upper cavity. In the upper cavity, there is a large recirculation of vapor due to the high temperature of the vapors rising from the central pool compared to the low temperature of the wall region induced by the cooling jacket. As a consequence, some of the condensable hydrocarbons form a mist as cool gas is drawn into the flow of hot vapors. Ultimately, the heavier hydrocarbons, those, for example, in the range of about C20 to about C60, condense on the walls of the vessel and run out of nozzle 310 as molten heavy wax. The uncondensed hydrocarbons and non-condensable gases leave by means of nozzle 317, which is sloped so that any liquids flow away from the upper cavity. Nozzle 317 leads to a jet scrubbing device by a short flow line, as discussed above.

Optionally, nozzles may be installed on the lower cavity and used to introduce pumpable materials into the reacting mixture as well as to withdraw the reacting mixture. Examples of pumpable materials which may be introduced are heavy oils or molten plastic and partially reacted material from a previous stage of reaction. The reasons to withdraw such materials are, for example, to send the material to a subsequent stage for thermal or microwave processing, to discard heavy residue material and to recover crude ultra heavy waxes as a product. The materials which leave in the vapor phase are typically in the carbon number range 9 to 60, with approximately 75% between carbon number 18 and 40. The material which remains in the condensed phase is in equilibrium with the vapor phase and consequently is significantly heavier, with 75% between carbon number 40 and 100. We have found that the precise carbon numbers of the vapor and liquid fractions depend on the severity of microwave depolymerization to which the material has been subjected. Consequently, if it is desirable to produce an ultra heavy wax with a specific range of carbon number, one way of accomplishing this is to reduce or increase the severity of reaction as well as to increase or reduce the ratio of stripping gas to feedstock (and consequently the split between vapor and condensed phases). Thus, by varying the operating conditions, it is possible to tailor the product weight mixture to at least some extent.

Filtration and Settling

The wax produced by microwave depolymerization of plastics under the process and with the apparatus described above may contain suspended solids, typically fine carbon formed as a byproduct of depolymerization and inert materials which were part of the original waste plastics. This material needs to be removed from the wax to improve the color. In addition, when polyethylene terephthalate is present in the feedstock, part of the product of depolymerization consists of terephthalic acid, 4-formylbenzoic acid and other, related chemicals which are below the triple point and therefore which desublimate to form a solid phase as the hydrocarbon vapor is cooled.

While these materials can be removed in various different ways, we have found that it may be advantageous to allow the material to settle for 4 to 24 hours, maintaining the material at a temperature above the wax melting temperature, but below water boiling point, typically 70 to 90 degrees Centigrade; and to keep the molten wax as a hydrocarbon layer on top of water. This arrangement enables the solid particulate to settle, and heavy particles such as terephthalic acid and inorganic matter to fall out of the hydrocarbon and through the water layer. Solid carbon tends to be present as extremely fine particulate matter, which is able to flocculate and settle to the bottom of the hydrocarbon layer. Due to the hydrophobic nature of this material, it typically does not fall through the water but rather forms a layer in which carbon is concentrated at the bottom of the hydrocarbon.

The hydrocarbon is therefore decanted from a few inches above the water/hydrocarbon interface level. The material still contains significant color bodies and typically varies from light brown to yellow in color. These color bodies and other residual solids can be removed by filtration. This step improves the appearance of the product and is a requirement if the product is to be further treated using catalysts.

Details of the Jet Scrubber and Wax Separator

As explained above with reference to FIG. 1, uncondensed hydrocarbon vapors and non condensable gases are sent to a jet scrubber where they are contacted with water. The water temperature is maintained above the wax melting temperature and the process is repeated in a second stage, operating at a lower temperature.

Figure 4:
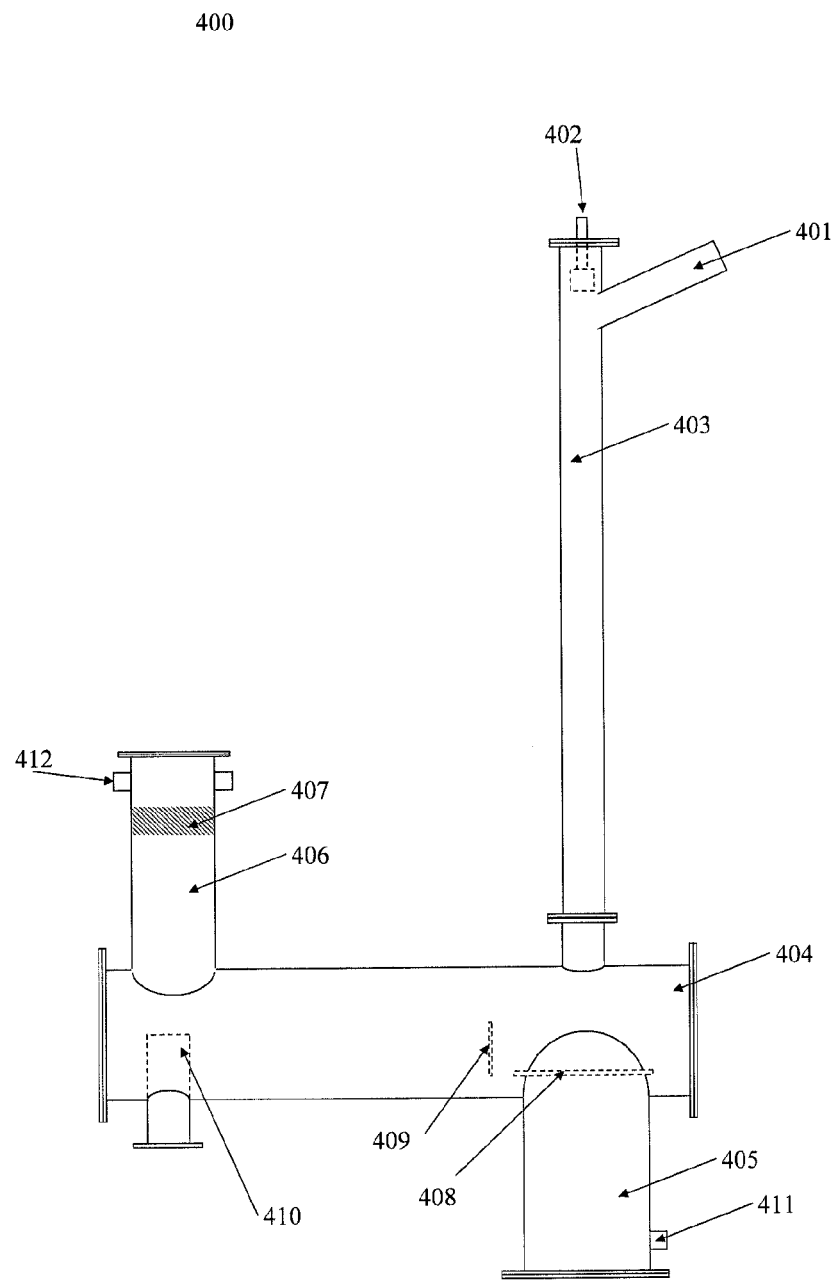
FIG. 4 is a schematic view of jet scrubber and wax separators.

In FIG. 4, reference numeral 400 denotes a piece of equipment which receives hydrocarbon mist, vapors and non condensable gases, contacts them with water and separates the materials into a vapor phase, a molten wax phase and an aqueous phase.

Hydrocarbon vapors, mist and non-condensable gases enter from the microwave cavity by means of nozzle 401, which slopes towards the jet scrubber 403. Water is introduced as a spray by means of nozzle 402 and enters the jet scrubber 403 co-axially and flows in a downward direction. The vapor and water are intimately mixed in the jet scrubber, such that the temperature of the gas is reduced, hydrocarbons condense to form a mist of hydrocarbon liquid and some immiscible solids (such as terephthalic acid). The water temperature is deliberately maintained a few degrees above the wax melting temperature so that the bulk hydrocarbon stream is liquid, which simplifies separation of hydrocarbons from water. The water is largely in the form of droplets, although part of the water impinges on the wall of the scrubber and therefore flows down the scrubber as a film.

The jet scrubber 403 is long compared to its diameter, typically between about 8 to about 20 diameters long. The liquid and gases from the jet scrubber 403 pass into a horizontal settling vessel, 404 which has a boot 405 to collect water and a vertical extension 406 with demister pad 407 to assist in removal of liquids from the gas stream. The liquid hydrocarbon (molten wax) leaves through nozzle 410, which protrudes into the vessel to approximately the halfway line and therefore acts as an overflow weir. This causes the horizontal vessel to operate half full of liquid and half full of gas. The upper half of the horizontal vessel acts as a conventional horizontal settler and supplies adequate residence time to allow the droplets (water and hydrocarbon) to settle. Additional settling takes place in the vertical extension and mist eliminator to ensure a high level of liquid removal from the gases leaving the device by nozzle 412. Under/overflow baffle 409 separates the region of the horizontal vessel below the jet scrubber (where there is much agitation) from the region downstream of the baffle, where droplets of water entrained in the bulk hydrocarbon or of hydrocarbon entrained in the water are able to settle into their appropriate phases. Similarly a baffle 408 separates the agitated zone from a calmer zone within the boot 405 where entrained hydrocarbon droplets are able to settle out of the water. Water finally leaves through nozzle 411.

Figure 5:
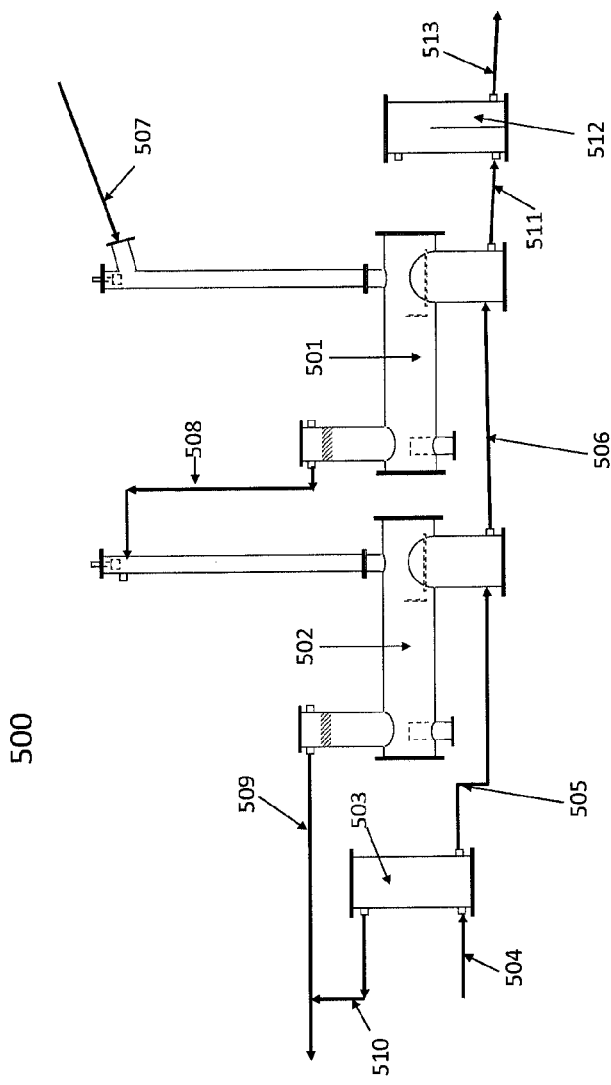
FIG. 5 is a schematic view of the arrangement of a plurality of jet scrubbers and wax separators.

In one embodiment illustrated in FIG. 5, reference numeral 500 denotes the system which includes two stages of scrubbing and settling followed by a balance tank and a neutralization tank. The vapor side pressures are essentially constant throughout the system: the jet ejectors produce a small amount of head from the momentum of the circulating water, and there are small losses in the pipes. The net effect is that the pressures are within a few inches water column of each other between the vessels. The vessels are arranged to be at appropriate levels and are connected by a number of water balance lines, as shown in FIG. 5. Water is fed into the head vessel, 503 by means of flow line 504 and level is maintained in 503 by level control. Water flows from head vessel 503 into separator vessel 502 through balance line 505 and from separator vessel 502 into separator vessel 501 through balance line 506 then to neutralization tank 512 through flow line 511 and finally to circulation pump (not shown) through flow line 513 to maintain appropriate levels in the vessels. The intent is that, with only water in the system, the levels in the two separators should be slightly below, perhaps approximately ½" below, the wax overflow pipe, so that with only water present there should be no overflow of water into the hydrocarbon piping. In addition, the neutralization tank 512 may be full of water, which permeates the neutralization agent (limestone chips). Vapors enter the scrubber attached to separator 501 by flow line 507 and from separator 501 to the scrubber attached to separator 502 by means of flow line 508. Gases from separator 502 leave the system by means of flow line 509, which is connected to the head tank by means of balance line 510. The gas side piping ensures that the pressures of the various vessels are essentially constant and only differ by small amounts. Water circulation equipment (pumps) and flow lines are not shown in this view.

Hybrid Thermal Microwave Reactor

As described above, partially depolymerized pumpable material may be subjected to additional stages of depolymerization, including thermal depolymerization. Thermal depolymerization may be advantageous in the context of integration of the overall flowsheet since it may be desirable to produce at least part of the electrical energy required to generate microwaves using a conventional internal combustion engine generator and incondensable depolymerization products as fuel. The use of such a generator implies that the exhaust from such generator is a readily available source of thermal energy which may be advantageously integrated into the process. Furthermore the oxygen utilization of internal combustion engines (and gas turbines) is such that additional heat may be obtained by using the exhaust as preheated gas for a fired heater.

The thermal reactor can take various alternative forms, and can be integrated with the microwave reactor to a greater or lesser extent, as may be desirable. In a preferred embodiment shown in FIG. 6, reference numeral 600 denotes the thermal reactor which is close coupled to the microwave reactor, by adding a "firebox" with burners and a draft system to the outside of the lower zone of the microwave reactor. Heat transfer on the process side is aided by the agitator and baffles (discussed previously). Thus it is possible to input somewhere in the range 100 to 200 kW of energy at reasonable efficiency. This is comparable to the amount of microwave energy used.

This arrangement has several advantages. In principle, liquid hydrocarbons pick up heat by convection in the wall region (where the microwave intensity is weak) and then circulate back through the microwave zone. With hydrocarbon depolymerization reactions, there is a well known tradeoff between temperature and residence time in the reaction zone. In the present case, the thermal zone is essentially a thin layer close to the wall, in which area the microwave energy is weak or absent and the microwave depolymerization zone is largely concentrated in the central part of the reaction zone, close to the surface and not too close to the walls. Loosely speaking, the microwave zone (i.e. where microwave energy is intense enough to promote reaction) is a disc approximately 100 mm less in diameter than the reactor and approx 15-50 mm thick (depending, of course on a number of factors, such as how much sensitizer is present and how intense is the agitation).

It is entirely possible that little or no depolymerization takes place in the thermal zone with the reactions delayed to the microwave depolymerization zone where the presence of microwaves causes the reactions to occur much more readily than in a thermal reactor. Consequently the thermal zone may be seen as simple way to augment the capacity and efficiency of the microwave depolymerization zone by adding additional energy from an inexpensive and non-microwave source, rather than solely using microwave energy.

Figure 6:
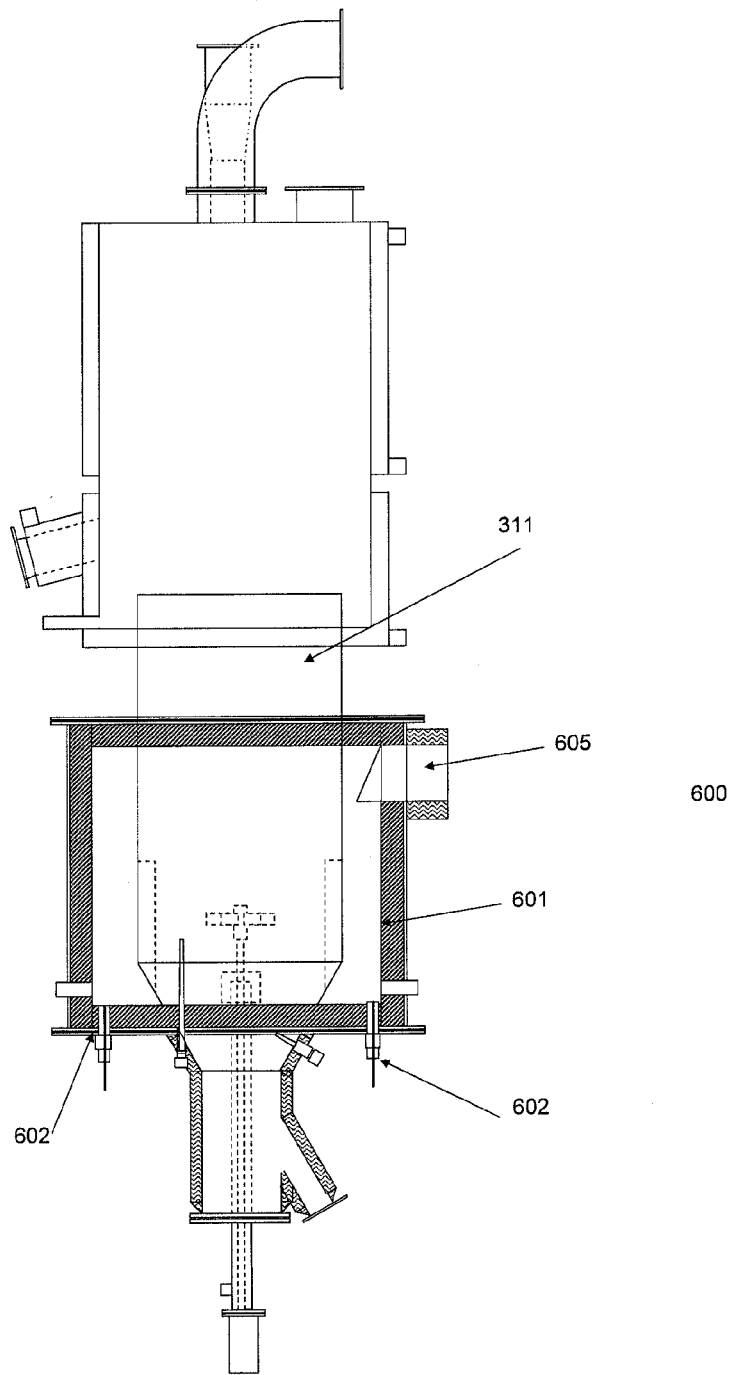
FIG. 6 is another embodiment of the microwave applicator of FIGS. 3A and 3B with the addition of a thermal depolymerization zone to the applicator.

The equipment for accomplishing this goal will be described with reference to FIG. 6. In FIG. 6, as shown earlier in FIG. 3, 300 denotes the microwave applicator described above and in particular 311 denotes the lower cavity of such applicator. Reference numeral 601 denotes a furnace enclosure which surrounds the lower cavity applicator 311. The furnace enclosure 601 may preferably be lined with a refractory, insulating material. Air or hot exhaust gases from a diesel generator acting as an oxidant and fuel gas are burned in a series of up-firing burners, 602, which are formed in a circle around the lower microwave reactor. The number of burners is chosen such that and are arranged so that the outer wall of the lower microwave reactor receives radiant energy rather uniformly from the burners. The burners will typically be located close to the refractory wall so that the wall acts to stabilize the flame and a large amount of the radiation is between the refractory wall and the reactor wall.

The radiant section is large enough so that the flames do not impinge on its walls. Hot gases leave the radiant section through exhaust nozzle, 605 which can be connected to a stack or the hot gases can be sucked through a heat recovery device using an induced draft fan Additional Processing to Improve Quality of Products The typical wax material produced from the process and apparatus of the present invention is contained after processing in accordance with the present invention, in crude wax tank 160 shown in FIG. 1. Crude wax tank 160 is fed by lines 136, 158 and 188, as described above. It has been found to be a broad boiling range material, consisting mainly of straight chain paraffinic hydrocarbons, from pentane through over 100 carbon atoms (with an average around 18 to 40 depending on processing conditions). The material also has been found to contain from 5 to 20% olefins, which are a combination of 1-olefins and internal olefins The material has been found to contain from 0 to 2% aromatics and from 0 to 3% branched chain material. The material may also contain small amounts of nitrogen compounds (<1000 ppm), sulfur compounds (<100 ppm) and chlorine compounds (<100 ppm).

The material is typically <5% light ends (<C6), 5% gasoline range (C6-C8), 20-30% "diesel range" (C9 through C20) and 60-65% "wax" (C21+).

The material produced by the process and apparatus of FIG. 1 can be further refined by means of the following processing steps, which can be used singly or in combination, which can be applied at the same site as the microwave depolymerization unit or in conjunction with a downstream processing unit and which can be used to target specific markets:

Short path distillation
Hydroprocessing
Isomerization
Fractionation

These are described more fully below.

Short Path Distillation—gets its name from the distance in which the vapor stream travels from the evaporation surface to the condenser. The evaporator wall generates the vapors as the feed moves by gravity, while being agitated and distributed evenly, down the evaporator wall. The vapor stream travels a "short path" directly to the condenser which is located within the evaporator chamber. It is conventional to operate at a high vacuum, sometimes an absolute pressure as low as 0.001 mbar. It is convenient for the microwave depolymerized wax product as secondary depolymerization is prevented, which is desirable. When short path distillation is applied, the wax product has greatly improved properties and can be used directly in certain applications. The overhead product, obtained by condensing the volatiles, is suitable for blending with petroleum derived hydrocarbons which may be used as a diesel product. The material condensed has desirable properties as a diesel blendstock (high cetane number), and in blending is limited by either the amount of olefins (which impacts the bromine number spec), the amount of sulfur (in the case of ULSD), or the amount of nitrogen.

In some cases, it may be better to use a Wiped Film Evaporator, rather than a short path still, but the same observations apply.

In still other cases, conventional distillation equipment is appropriate.

Figure 7:
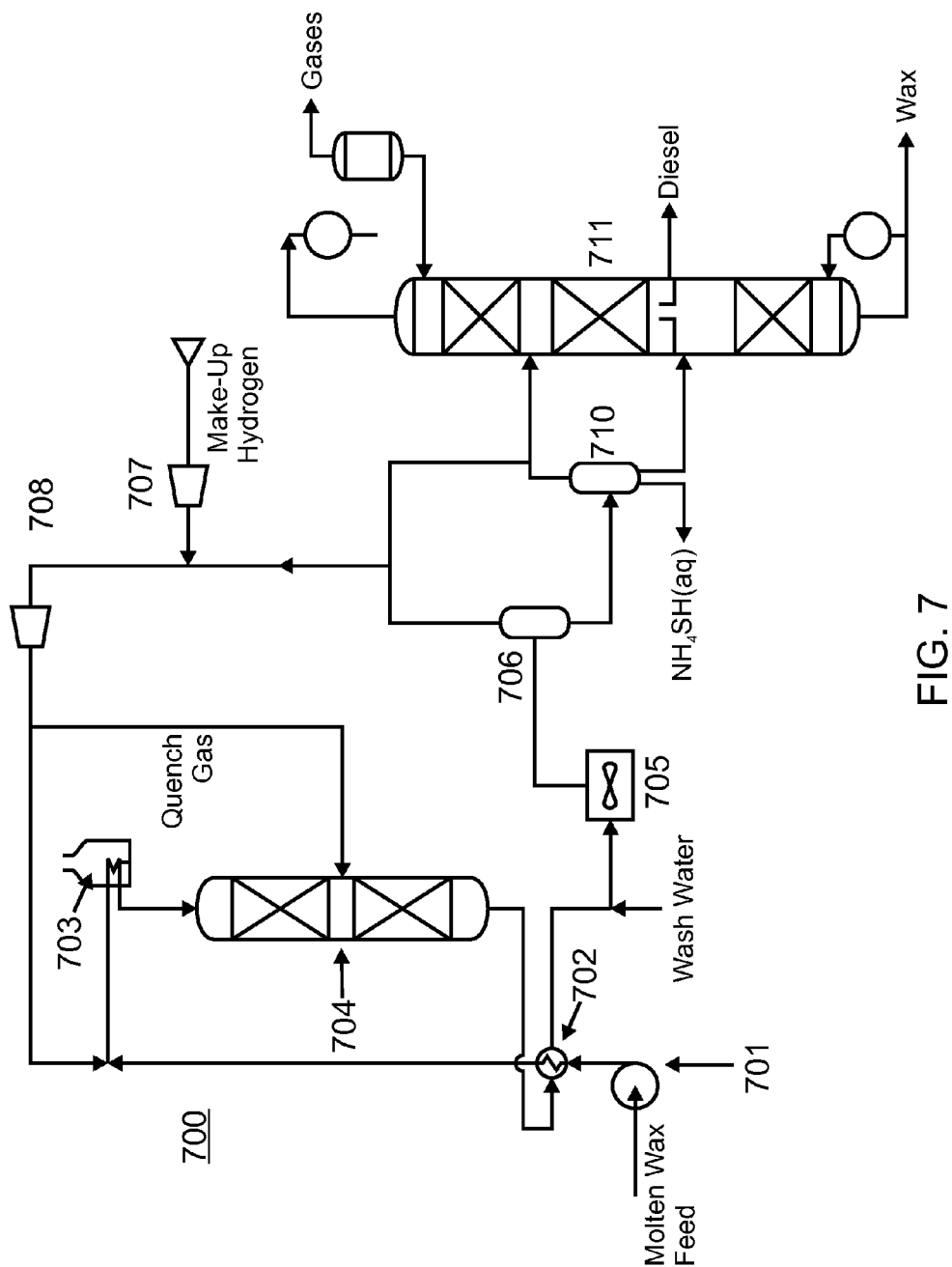
FIG. 7 is a schematic view of an arrangement of devices for hydrocarbon processing.

Hydroprocessing—this is understood to encompass several distinct reactions which in practice often occur together: hydrogenation of olefin bonds, hydrodesulphurization of organic sulfur compounds, hydrodenitrogenation of organic nitrogen compounds, hydrodepolymerization, and to a limited extent, isomerization. With the microwave wax product, it is useful to distinguish between commercial situations in which hydrodepolymerization is desirable and those in which it is not desirable. Thus, in a situation where a high quality wax product is required, it is useful to have mild conditions present in which hydrogenation, hydrodesulphurization and hydrodenitrogenation take place but in which hydrodepolymerization and isomerization are limited. FIG. 7 depicts a typical processing arrangement which targets high quality wax. In FIG. 7, 700 depicts the hydroprocessing unit. Wax product is first pumped from crude wax tank 160 through a line (not shown) to the hydroprocessing unit 700. Crude wax is then pumped to pressure (typically about 300 to about 900 psi) using a charge pump 701, then preheated in Feed Effluent exchanger 702 and mixed with recycled hydrogen. The mixture is taken to reaction temperature (typically about 600 to about 750 deg F.) in fired heater 703. The mixture is passed across a hydrotreating catalyst (such as a CoMoS or NiMoS) with a liquid hourly space velocity of between about 0.5 and 5 hours in reactor 704. Recycle hydrogen may be introduced between packed beds of catalyst in the reactor 704 in order to control the temperature rise. The reactor is typically a trickle bed, in which liquid and vapor phases are both present and flow together through a packed bed of solid catalyst. The reactor effluent is cooled in Feed Effluent exchanger 702 and a small amount of process water is added (to dissolve ammonia liberated by the hydrogenation of nitrogen compounds). The reactor effluent is cooled further in air cooler 705 and separated into two liquid phases and a vapor phase in high pressure separator 706. The raw wax typically contains more nitrogen than sulfur and consequently the aqueous stream condensed will consist of ammonia and ammonium sulfide and it may not be necessary to employ a separate H2S absorber. The vapor from the high pressure separator is circulated back to the reactor, using compressor 708. A small amount of the vapor is purged (to control concentration of inerts and low molecular weight hydrocarbons) and hydrogen is added by means of make up compressor 707.

The liquid stream from the high pressure flash drum 706 is let down into low pressure flash drum, 710, to release dissolved gases. The drum is designed as a three phase separator and the aqueous stream, containing ammonia and dissolved hydrogen sulfide, commonly known in the trade as sour water, is removed separately from the hydrocarbon liquid stream and the aqueous stream is treated for disposal (typically by stripping and incinerating the ammonia and hydrogen sulfide and passing the stripped water to a waste water treatment plant).

The vapor stream from flash drum 710 contains a significant amount of C21+ wax material and the liquid hydrocarbon from flash drum 710 contains a significant amount of diesel (likely about C9-C20). Therefore, it is typical to employ some form of fractionation. In FIG. 7, the vapor and liquid streams pass from flash drum 710 to a distillation column 711 with reboiler and condenser, which strips C20- hydrocarbons from the wax and produces fuel gas as an overhead product, and a distillate stream in the diesel/kero range as a side draw.

This processing scheme produces a high quality, highly parafinnic diesel blendstock and a high quality wax.

Isomerization—can be carried out for different purposes and in different ways. If the processing objective is to produce high quality wax and very high quality diesel blendstock (which will not degrade the cold flow properties of the diesel), an appropriate processing scheme would incorporate a bed of isomerization catalyst to treat the vapor phase (only) which leaves the flash downstream of the hydrotreating reactor in the above described processing scheme. The distillate and naphtha range materials would therefore be isomerized and the balance of the processing scheme can be as before. This will lead to diesel blendstock with improved cold flow properties and high quality wax as products.

A second scenario in which isomerization may be desirable is to produce lube base oil as one of the end products of the process of the present invention. This processing scheme is similar to that described above except that the catalyst is different and the processing conditions are of somewhat higher severity (temperature and pressure). Essentially in this scenario, the catalyst is a hydrodepolymerization catalyst, operated under mild conditions.

A third scenario would use essentially the same configuration but with more severe hydrodepolymerization conditions. This would lead to a higher yield of diesel material and less lube base oil.

The detailed descriptions above in connection with the corresponding figures are intended to illustrate the present invention, and are not intended to represent the only forms in which the present invention may be constructed and/or utilized. While the descriptions set forth the structure and the sequence of steps for practicing the present invention in connection, it is to be understood, however, that the same or equivalent structures and steps may be accomplished by different embodiments that are also intended to be encompassed within the spirit and scope of the invention. Accordingly, it is not intended that the invention be limited except by the claims.

It is noted that one or more references are incorporated herein. To the extent that any of the incorporated material is inconsistent with the present disclosure, the present disclosure shall control. Furthermore, to the extent necessary, material incorporated by reference herein should be disregarded if necessary to preserve the validity of the claims.

Further, while the description above refers to the invention, the description may include more than one invention.

What is claimed is:

1. Apparatus for the continuous processing of high molecular weight organic materials, comprising:
   a reaction vessel constructed and arranged to receive the high molecular weight organic materials and enclose a liquid mass;
   an opening in the reaction vessel to receive the high molecular weight organic materials;
   a source of microwave energy which is introduced into the reaction vessel through a waveguide port, constructed and arranged to impinge upon to heat the materials within the reaction vessel and cause microwave depolymerization of the materials through microwave absorption by the materials;
      an agitator to agitate and mix the liquid mass to maximize microwave absorption;
   the depolymerization by microwave energy heating the materials to form liquid state portions and vapor state portions;
   wherein the liquid mass is maintained in the liquid state during processing of the materials;
   wherein the microwave absorption into the liquid mass effects microwave depolymerization via rapid heating and quenching so as to form long-chain liquid products;
   wherein the long-chain liquid products produced are synthetic oils used in the production of fuels, waxes and lubricants;
   wherein the temperature of a portion of the reaction vessel is in the range of about 350 degrees C. to about 425 degrees C.; and
   a collection apparatus constructed and arranged to remove one or more of the liquid state portion and the vapor state portion of the materials from the reaction vessel.

2. The apparatus of claim 1, wherein the high molecular weight organic materials comprises one or more of: waste plastics, waste oils, petroleum residues, tires, oil sands, oil shale and cellulose materials.

3. The apparatus of claim 1, wherein the high molecular weight organic materials are plastics recovered and/or diverted from municipal solid waste.

4. The apparatus of claim 1, wherein a scrubber and a separator device downstream of the scrubber are operatively connected to the collection apparatus, and wherein the vapor portion removed from the reaction vessel is condensed by the scrubber, the separator device causing the separation of at least the vapor portions and the liquid portions of materials exiting the scrubber.

5. The apparatus of claim 1 further comprising at least one of: (a) a barrier which is transparent to microwave energy located in the vicinity of the waveguide port or (b) a port to introduce a gaseous material into the waveguide to isolate the microwave energy source from the vapor state and liquid state portions in the reaction vessel.

6. The apparatus of claim 1, further comprising a source of heating at least partially contacting the exterior of the reaction vessel.

7. The apparatus of claim 1, wherein the pressure in the reaction vessel is in the range of about minus 10 psig to about plus 15 psig.

8. The apparatus of claim 1, wherein the liquid state portion includes a wax product which is collected from the reaction vessel and is moved to a crude wax tank,
   further comprising one or more refining units downstream of the crude wax tank.

9. The apparatus of claim 8, wherein the one or more refining units comprises one or more of units for: distillation, hydroprocessing, isomerization and fractionation.

10. A method for the continuous processing of high molecular weight organic materials, comprising the steps of:
    introducing the materials into a reaction vessel constructed and arranged to receive the high molecular weight organic materials through an opening in the reactor vessel and enclose a liquid mass;
    using a source of microwave energy to introduce impinging microwave energy into the reaction vessel through a waveguide port to cause heating of the materials within the reaction vessel and causing microwave depolymerization of the materials through microwave absorption of the materials;
    wherein the deploymerization by microwave energy heats the materials to form liquid state portions and vapor state portions;
    maintaining the temperature of one of the portions of the reaction vessel in the range of about 350 degrees C. to about 425 degrees C.;
    wherein the liquid mass is maintained in the liquid state during processing of the materials;
    wherein the microwave absorption into the liquid mass effects microwave depolymerization via rapid heating and quenching so as to form long-chain liquid products;
    wherein the long-chain liquid products produced are synthetic oils used in the production of fuels, waxes and lubricants;
    providing at least one of a mechanical mixer and a gaseous material input within the reaction vessel, and mixing the liquid mass in the reaction vessel; and
    removing one or more of the liquid portion and the vapor portion of the materials from the reaction vessel.

11. The method of claim 10, wherein the high molecular weight organic materials comprises one or more of: waste plastics, waste oils, petroleum residues, tires, oil sands, oil shale and cellulose materials.

12. The method of claim 10, wherein the high molecular weight organic materials are plastics recovered and/or diverted from municipal solid waste.

13. The method of claim 10, wherein a scrubber and a separator device downstream of the scrubber are operatively connected to the collection apparatus, and wherein the vapor portion removed from the reaction vessel is condensed by the scrubber, the separator device causing the separation of at least the vapor portions and the liquid portions of materials exiting the scrubber.

14. The method of claim 10, further comprising providing a source of heating at least partially contacting the exterior of the reaction vessel.

15. The method of claim 10, wherein the pressure in the reaction vessel is maintained in the range of about minus 10 psig to about plus 15 psig.

16. The method of claim 10, further comprising providing at least one of: (a) a barrier which is transparent to microwave energy located in the vicinity of the waveguide port or (b) a port to introduce a gaseous material into the waveguide to isolate the microwave energy source from the vapor state and liquid state portions in the reactor vessel.

17. The method of claim 10, wherein the liquid state portion includes a wax product, further comprising the steps of collecting the wax product from the reaction vessel, moving the wax product to a crude wax tank, and refining the crude wax collected in the crude wax holding tank.

18. The method of claim 17, wherein the steps of refining the crude wax comprise one or more of the steps of: distillation, hydroprocessing, isomerization and fractionation.

* * * * *